Nov. 29, 1949  M. H. FRANK  2,489,527

CRANKSHAFT LUBRICATION

Filed April 24, 1944

Inventor
Mark H. Frank
By
Attorneys

Patented Nov. 29, 1949

2,489,527

UNITED STATES PATENT OFFICE 2,489,527

CRANKSHAFT LUBRICATION

Mark H. Frank, Birmingham, Mich., assignor to General Motors Corporation, Detroit, Mich., a corporation of Delaware Application April 24, 1944, Serial No. 532,462

3 Claims. (Cl. 184—6)

1

This invention is the outcome of efforts to improve the lubrication of engines characterized by reciprocating pistons acting to rotate crankshafts. More particularly, it is concerned with the lubrication of the bearings between the crankpins of a crankshaft and the ends of the connecting rods.

Among the objects sought to be attained is the provision for a better supply of oil to the high pressure region of such bearings. Other objects and advantages including the accomplishment of the major objects by a construction both simple and inexpensive will be understood from the following description.

Figure 1:
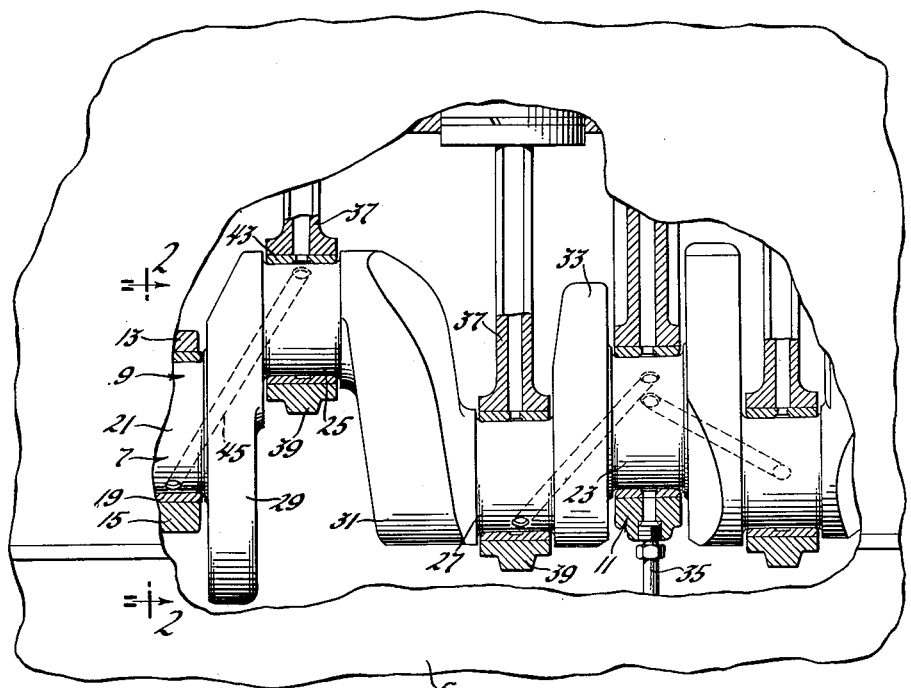

The accompanying drawing shows by Fig. 1, a crankcase in elevation, the crankcase being broken away to show the crankshaft, the main and connecting rod bearings being shown in section.

Figure 2:
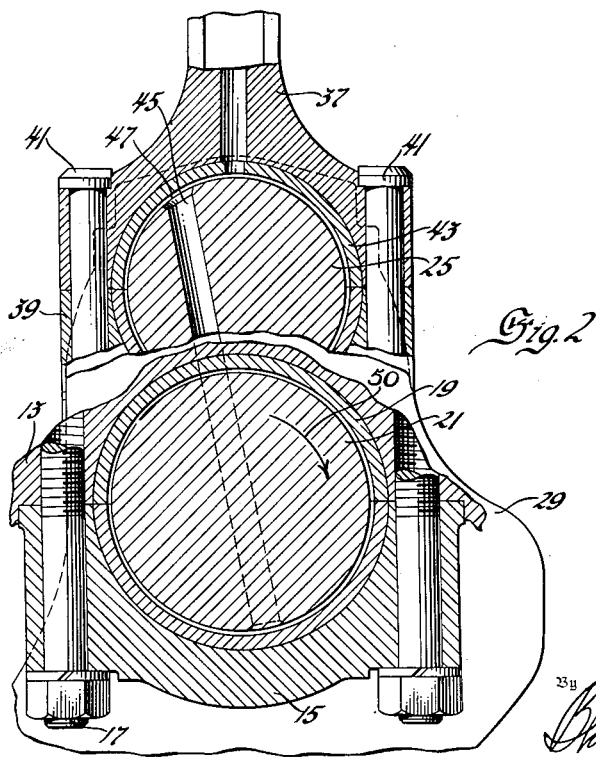

Fig. 2 is a transverse section, the plane of the section being identified on Fig. 1.

On the drawing the crankcase is marked 5 and numeral 7 is used to identify the crankshaft. The left end of the shaft is to be at the front end of the engine and the other end will be designed to carry the flywheel, not shown. As is customary, the shaft will have clockwise rotation as seen from its front end. There are several main bearings. The drawing shows a front end main bearing indicated as a whole by numeral 9. An intermediate bearing is shown and marked with numeral 11. There will be at least one other main bearing. It may be assumed to be a rear end bearing, not shown.

At the front end bearing 9 there is marked a fixed bearing member 13 and a cap 15 which is secured to member 13 by fastening means 17. The drawing also shows a bearing shell 19, surrounding the journal 21 and within parts 13 and 15. The intermediate shaft journal 23 is similarly embraced by a bearing shell and fixed and removable bearing members.

The shaft has radially displaced and offset crankpins 25 and 27 between the main bearings 9 and 11. There are the usual webs or arms 29, 31, 33 spacing the parts described.

To the right of main bearing 11 there will be other crankpins for other connecting rods as will be understood.

The main bearings are to be supplied with liquid lubricant in some conventional way. The drawing shows a tube 35 leading to bearing 11 from some suitable but not illustrated source, perhaps an engine driven oil pump. The connecting rod ends are marked 37. Caps 39 are secured thereto by bolts 41. Within the bearings so formed and

2 surrounding the crankpins 25 and 27 are bearing shells 43.

For lubricating the first connecting rod bearing with oil from the front main bearing 9, a passage 45 is bored in the main bearing journal, through web 29 and across the pin 25. The passage has radial and axial components as it must because of the axial and radial spacing of the pin relative to the main bearing 9. The passage 45 is rectilinear and opens at an orifice 47 on the crankpin surface. The orifice 47, as well as the orifice at the opposite end of the passage 45, is formed by face drilling the bearing journal in a radial direction prior to drilling the passage 45. This facilitates the starting of the drill when drilling the passage 45. Reference to Fig. 2 will show that this passage not only extends axially and radially but that it is angularly related to a plane determined by the crankshaft axis and the crankpin center and that it is so directed that the orifice 47 is to the left of said plane as seen from the front end and with the pin 25 at its upper dead center position.

It is well known that the pressure between the crankpin and the connecting rod bearing surrounding the pin varies around the pin periphery as a result of the several forces acting on the pin, such forces as the explosive force driving the piston and the centrifugal force on the connecting rod. Except for low speed high load conditions the high pressure region is at that arc of the pin periphery adjacent the crankshaft axis. Since the same arcuate surface is always nearest the crankshaft axis as the crankshaft rotates and since the orifice 47 of passage 45 is similarly fixed on the crankpin surface there is an unchanged space relationship between the two, the relationship being shown in Fig. 2, which represents the crankpin in a position corresponding to the upper dead center position of its piston. As the crankpin goes around the crankshaft axis in the direction indicated by arrow 50 the orifice is always less than 180 degrees from the arc of the pin periphery nearest the shaft axis measured in a clockwise direction from that arc and so measured because of the clockwise rotation of the crankshaft. In consequence of this arrangement the oil has a lesser distance of travel to reach the high pressure region than if the orifice were diametrically opposite the high pressure region, i. e., diametrically opposite that part of the pin periphery adjacent the crankshaft axis, a location which is frequently adopted.

It will be observed that the oil passages from intermediate main bearing 11 supply crankpin bearings on either side thereof and that these passages will similarly be angularly related to planes determined by the crankshaft axis and crankpin center and deliver at orifices on that side of such planes requiring a travel of less than 180 degrees to the high pressure region.

Tests have shown that passages drilled as above described are effective in reducing bearing wear and producing longer bearing life.

I claim:

1. A crankshaft comprising a main journal, a crank pin or connecting rod journal, and a web connecting said main journal and said crank pin or connecting rod journal, an oil passage being formed as a straight drilling between said main journal and said crank pin or connecting rod journal so as to connect points of the journal surfaces which are on opposite sides of the common axial plane of said two journals, said drilling passing through said web.

2. A crankshaft as claimed in claim 1, a shallow recess being provided in at least one of said journals, said oil passage starting from said recess.

3. A crankshaft comprising a main journal, a crank pin or connecting rod journal, and a web connecting said main journal and said crank pin or connecting rod journal, an oil passage being formed as a straight drilling between said main journal and said crank pin or connecting rod journal so as to pass through the centerline of one of said journals and connect points of the journal surfaces which are on opposite sides of the common axial plane of said two journals, said drilling passing through said web.

MARK H. FRANK.

REFERENCES CITED

The following references are of record in the file of this patent:

UNITED STATES PATENTS

| Number | Name | Date |
| --- | --- | --- |
| 1,077,511 | Coninck | Nov. 4, 1913 |
| 1,230,460 | Brush | June 19, 1917 |
| 1,596,828 | Guernsey | Aug. 17, 1926 |
| 1,834,285 | Loeffler | Dec. 1, 1931 |
| 1,855,500 | Vincent | Apr. 26, 1932 |
| 2,289,233 | Beall | July 7, 1942 |

FOREIGN PATENTS

| Number | Country | Date |
| --- | --- | --- |
| 418,517 | Great Britain | Oct. 26, 1934 |